US009844021B2

United States Patent
Yoshizawa

(10) Patent No.: US 9,844,021 B2
(45) Date of Patent: Dec. 12, 2017

(54) SYSTEM AND METHOD FOR REDIRECTING A MOBILE DEVICE

(75) Inventor: Takahito Yoshizawa, Boom (BE)

(73) Assignee: Thomson Licensing (FR)

( * ) Notice: Subject to any disclaimer, the term of this patent is extended or adjusted under 35 U.S.C. 154(b) by 0 days.

(21) Appl. No.: 13/322,677

(22) PCT Filed: May 25, 2010

(86) PCT No.: PCT/EP2010/057120
§ 371 (c)(1),
(2), (4) Date: May 1, 2012

(87) PCT Pub. No.: WO2010/136430
PCT Pub. Date: Dec. 2, 2010

(65) Prior Publication Data
US 2012/0208542 A1    Aug. 16, 2012

(30) Foreign Application Priority Data
May 28, 2009 (EP) .................................. 09447025

(51) Int. Cl.
*H04W 68/00* (2009.01)
*H04W 84/04* (2009.01)

(52) U.S. Cl.
CPC .......... *H04W 68/00* (2013.01); *H04W 84/045* (2013.01)

(58) Field of Classification Search
CPC ........................... H04W 68/00; H04W 84/045
USPC .................. 370/315, 252; 455/13.3, 436
See application file for complete search history.

(56) References Cited

U.S. PATENT DOCUMENTS

| 5,940,756 A | 8/1999 | Sibecas et al. |
| 7,313,358 B1 | 12/2007 | Ricci et al. |
| 7,433,698 B2 | 10/2008 | Marjelund et al. |
| 8,160,638 B2* | 4/2012 | Salowey .................... 455/552.1 |
| 2003/0003928 A1 | 1/2003 | Marjelund et al. |
| 2007/0270152 A1 | 11/2007 | Nylander et al. |
| 2008/0076411 A1 | 3/2008 | Khetawat et al. |

(Continued)

FOREIGN PATENT DOCUMENTS

| CN | 101064929 | 10/2007 |
| CN | 101400087 | 4/2009 |

(Continued)

OTHER PUBLICATIONS

"3GPP TR 25.820 v8.2.0; 3rd Generation Partnership Project; Technical Specification Group Radio Access Networks; 3G Home NodeB Study Item Technical Report (Release *)", 3GPP TR 25.820 V8.2.0, vol. 25.820, No. V8.2.0, Sep. 1, 2008, pp. 1-40.

(Continued)

*Primary Examiner* — Charles Appiah
*Assistant Examiner* — Margaret G. Mastrodonato
(74) *Attorney, Agent, or Firm* — Jack Schwartz & Associates, PLLC

(57) ABSTRACT

The present invention concerns a femtocell device and method at a femtocell device comprising a first interface for communicating to a macrocell and a second interface for communicating to a broadband network, the method comprising the steps of, when communication to the broadband network is inactive, receiving a paging message from the macrocell destined to a mobile device connected to the femtocell device, and notifying the mobile device to redirect to the macrocell.

8 Claims, 6 Drawing Sheets

(56) References Cited

U.S. PATENT DOCUMENTS

| | | |
|---|---|---|
| 2009/0061873 A1* | 3/2009 | Bao et al. ............... 455/436 |
| 2009/0098871 A1* | 4/2009 | Gogic ................. 455/435.1 |
| 2009/0149194 A1 | 6/2009 | Howard |
| 2009/0215438 A1* | 8/2009 | Mittal ............ H04M 3/42195 |
| | | 455/418 |

FOREIGN PATENT DOCUMENTS

| | | |
|---|---|---|
| GB | 0122060 | 1/1919 |
| GB | 0428049 | 5/1935 |
| GB | 2371717 | 7/2002 |
| JP | 07131516 | 5/1995 |
| WO | WO0007400 | 2/2000 |
| WO | 2006067475 | 6/2006 |

OTHER PUBLICATIONS

"Universal Mobile Telecommunications System (UMTS); Radio Resource Control (RRC); Protocol Specification (3GPP TS 25.331 version 8.6.0 Release 8) ETSI TS 125 331", ETSI Standard, European Telecommunications Standards Institute (ETSI), Sopia Antipolis Cedex, France, vol. 3-R2, No. V8.6.0, Apr. 1, 2009 pp. 51-60.

* cited by examiner

SYSTEM AND METHOD FOR REDIRECTING A MOBILE DEVICE

This application claims the benefit, under 35 U.S.C. §365 of International Application PCT/EP2010/057120, filed May 25, 2010, which was published in accordance with PCT Article 21(2) on Dec. 2, 2010 in English and which claims the benefit of European patent application No. 09447025.9, filed May 28, 2009.

FIELD OF THE INVENTION

The present invention relates generally to femtocells and in particular to a method in a femtocell for managing user equipments.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

A macrocell is a cell in a mobile phone network that provides radio coverage served by a cellular base station, namely a NodeB in a universal mobile telecommunication system (UMTS) network. It is adapted to connect cellular handsets to a mobile network. The area covered by a base station is called a cell. When a cellular handset is located in a cell, it can connect to the base station. A location area is a set of base stations that are grouped to optimize signaling. Each location area comprises one or more network cells.

A femtocell, also called an access point base station or a Home Node B, is a cellular base station. From a mobile handset, it is functionally similar to a macrocell cellular base station. A femtocell is adapted to cover a much lower cell range than a macrocell. The cell size covered by a femtocell is called a pico cell hereinafter. The pico cell may also be called a femtocell hereinafter. A typical use of a femtocell is inside a building to cover areas that are not reached by a macrocell. A cellular service operator provides a plurality of macrocells and femtocells. The femtocell is usually connected to the service provider network through a broadband connection. The broadband connection is used as the backhaul link to the mobile operator's network. Therefore, the availability of this broadband connection determines alternative use of the 3G radio connection between the femtocell and a User Equipment (UE). One such alternative is to control the home network environment. In femtocell operation, under the normal circumstance, the 3G radio of the femtocell is likely to be turned off when the broadband connection goes down. One obvious reason is that, when the broadband connection is down, no call can be made using the femtocell as the backhaul link is not available. However, loss of 3G radio link between the femtocell and the UE implies that UE can not be used to control the home network environment.

SUMMARY OF THE INVENTION

The present invention attempts to remedy at least some of the concerns connected with the femtocell in the prior art. It enables to use an UE as a control device in the home network; and in particular when the broadband connection is disabled.

To this end, the invention relates to a method at a femtocell comprising a mobile networking interface for communicating to a macrocell and a second interface for communicating to a broadband network, the method comprising the steps, when communication to the broadband network is inactive, of receiving a paging message from the macrocell destined to a mobile device connected to the femtocell, and notifying the mobile device to redirect to the macrocell.

Advantageously, even when the broadband connection is disabled, an UE connected to the femtocell remains reachable from the mobile network. This permits to use the UE as a control device in the home network, while providing connectivity to the mobile network.

The invention also relates to a method at a femtocell comprising a first interface for communicating to a macrocell and a second interface for communicating to a broadband network, the method comprising the steps, when communication to the broadband network is inactive, of receiving a mobile network call setup from a mobile device connected to the femtocell, rejecting the call setup, and notifying the device to redirect to the macrocell.

When the broadband connection is disabled, an UE connected to the femtocell can still reach the mobile network when necessary.

According to an embodiment the method comprises the step of indicating in the notification the reason for redirection.

According to an embodiment the method comprises the step of notifying the device when the broadband network is inactive.

According to an embodiment the method comprises the step of notifying the device when the broadband network is active Another object of the invention is a femtocell device comprising a first interface for communicating to a macrocell, a second interface for communicating to a broadband network, a paging module for identifying paging messages destined to a device connected to the femtocell, and a redirecting module for, on reception of a paging message from the macrocell destined to a device connected to the femtocell, and when the communication to the broadband network is inactive, notifying the device to redirect to the macrocell.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which:

In FIGS. 1 and 2, the represented blocks are purely functional entities, which do not necessarily correspond to physically separate entities. Namely, they could be developed in the form of hardware or software, or be implemented in one or several integrated circuits.

DETAILED DESCRIPTION OF PREFERRED EMBODIMENTS

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modifications known to those skilled in the art.

Figure 1:
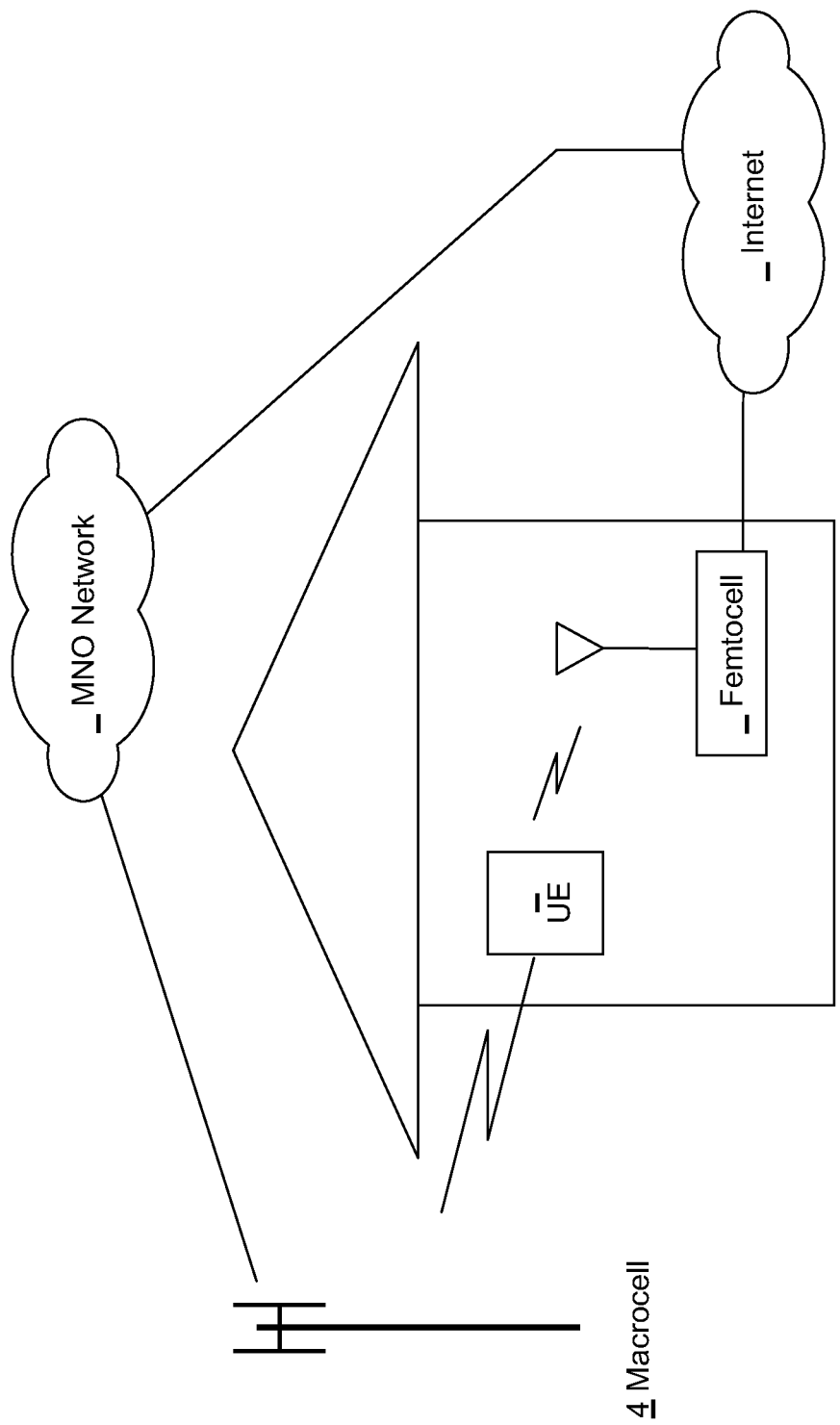
FIG. 1 is a block diagram of a system compliant with the embodiment.

The present embodiment concerns a femtocell in a system as illustrated in FIG. 1. The femtocell 1 is connected to the service provider network, also called the mobile network operator network 5, through a broadband connection. In the embodiment, the broadband connection is a digital subscriber line connection that provides connection to the Internet 2. The femtocell 1 located in the home environment is connected to the Internet 2 through a digital subscriber line gateway not represented. The femtocell device is a standalone device. Of course the femtocell might also be embedded in such a gateway. The femtocell enables to connect a UMTS compatible user equipment 3, noted UE hereinafter. When connected to the femtocell, the UE accesses the MNO network through the Internet. The UE 3 may also be connected to the MNO network through a macrocell 4 in a manner well known per se.

Figure 2:
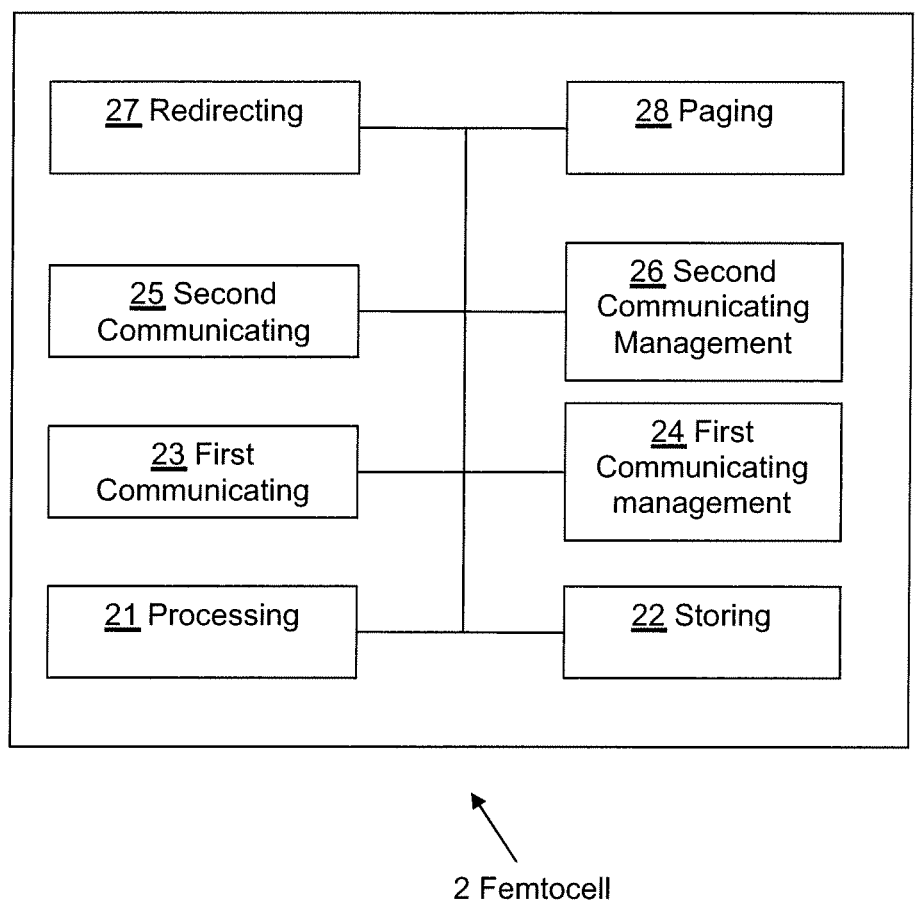
FIG. 2 is a block diagram of an object compliant with the embodiment.

The femtocell device is represented in FIG. 2. It comprises a first communicating module 23 for emitting and receiving in the UMTS network. In particular the first communicating module is a 3G radio emitter-receiver. More generally, this is a mobile networking interface. A first communicating management module 24 is adapted to perform the management and control functions of the first communicating module. The femtocell device also comprises a second communicating module 25 for emitting and receiving in the broadband network. A second communicating management module 26 is adapted to perform the management and control functions of the second communicating module. In the embodiment, the broadband network is of digital subscriber line technology. Of course it could also be any other type of broadband connection, such as a cable, fiber optics or satellite. The femtocell device also comprises storing module 22 such as a memory for storing among others the list of UE identifiers as indicated hereinafter. The femtocell device also comprises a processor 21 that is adapted to execute the algorithm of the embodiment.

The femtocell comprises a redirecting module 27 for redirecting the UE as indicated hereinafter. The femtocell also comprises a paging module 28 for identifying paging message coming from the macrocell. The paging module is adapted to set up the redirecting module, as indicated hereinafter.

The second communicating management module is adapted to detect when the DSL link is up or down. When the DSL link goes up or down, the second communicating management module informs the first communicating management module on the DSL link status. The first communicating management module then takes the appropriate actions as described hereinafter.

When the DSL link goes down, and if at least an UE is registered to the femtocell, the femtocell maintains the 3G radio on, instead of turning it off. It keeps the 3G radio connection to the UE in its coverage area. This allows the UE to keep using the 3G radio connection to the femtocell in order to control the home network environment within the home. However, due to the fact that the DSL link is down, any 3G cellular service through the femtocell is not available because there is no connection to the Mobile Network.

If no UE are registered to the femtocell when the DLS link goes down, the femtocell doesn't maintain the 3G radio on. The femtocell may be deactivated, or be put in a power save mode in order to detect the presence of an UE, in a manner that is out of the scope of the present invention.

The paging module is also activated. This permits the femtocell device to listen to the nearby available macrocell for the paging traffic.

In particular, the paging module maintains a paging list of UEs for which it listens to paging messages. This paging list comprises the UE that are registered to the femtocell. When a UE leaves the femtocell, it is removed from the list. When a UE enters the femtocell, it is added to the paging list.

Figure 3:
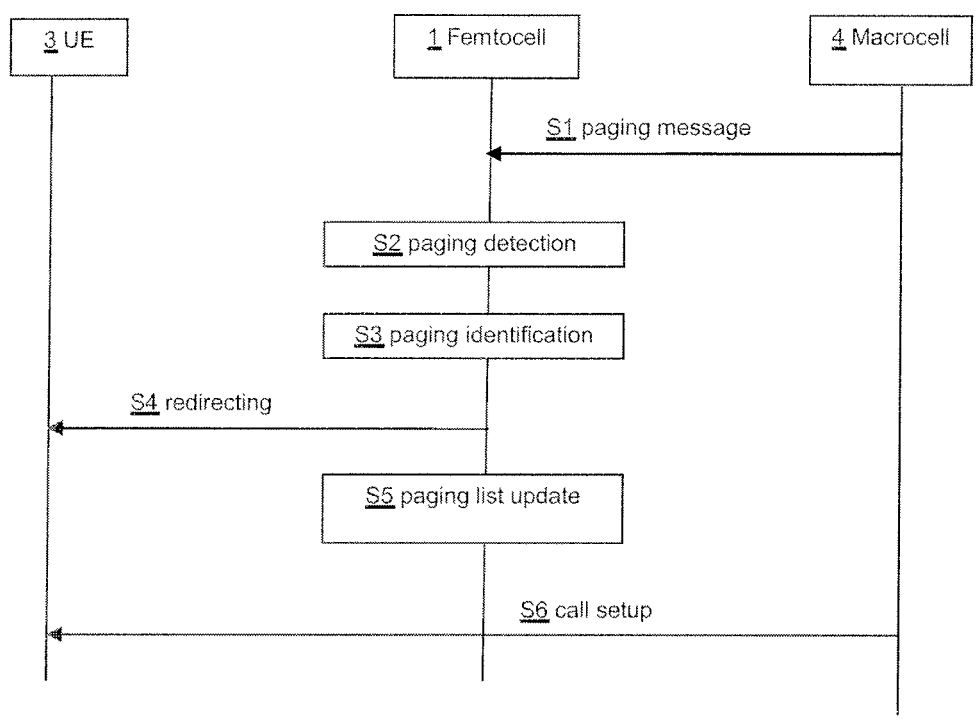
FIG. 3 is a first flow chart of a method according to the embodiment.

As illustrated in FIG. 3, the macrocell sends a paging message in order to set up a call from the Mobile Network to the UE, step S1.

The femtocell detects the paging message, step S2. It further detects that the paging message is destined to the UE 3 that is currently under the femtocell, and which is in the paging list, step S3.

The femtocell notifies the UE, step S4, to redirect to the macrocell. This steers the UE to reselect the macrocell. Then the UE can receive the paging message from the macrocell. This allows the UE to receive the incoming calls from the MN, step S6. In the meantime, the femtocell does no longer listen to paging message issued for that UE; it releases that UE from the paging list, step S5.

Figure 6:
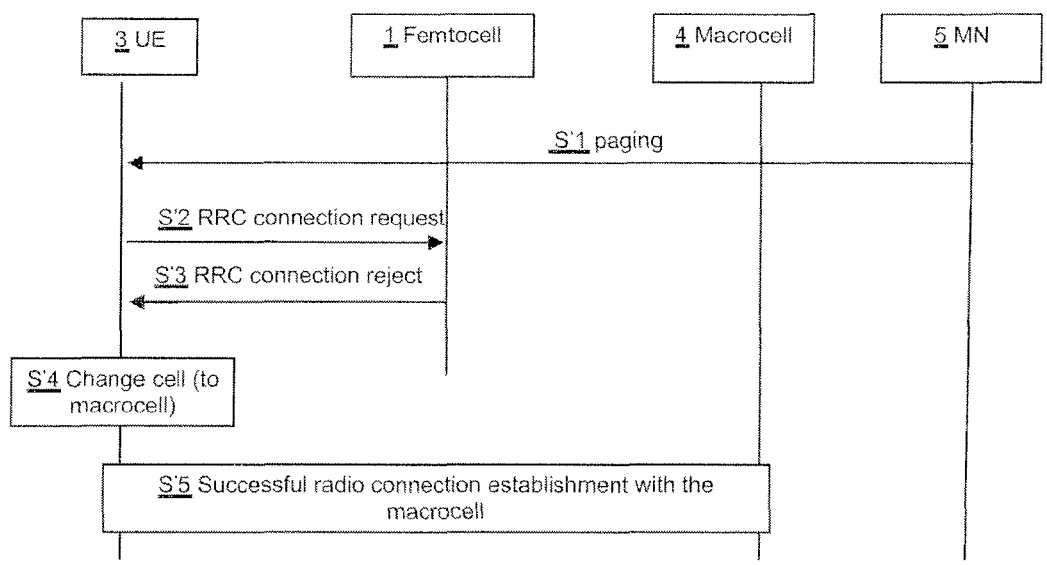
FIG. 6 is a flow chart illustrating the redirection method.

Redirecting is performed as follows. The femtocell forwards the paging message toward the UE that is currently under this femto. Then the following sequence takes place, as illustrated in FIG. 6, in a general manner compliant to the 3GPP specifications:

Step S'1, the UE receives the paging message forwarded by the femto,

Step S'2, when the femto receives the paging response from the UE, it essentially rejects the UE's request to establish an active radio connection with a redirection info, step S'3. This effectively gives a message "current cell is not available, go to other cell indicated in the redirection info" as specified in 3GPP, Step S'4, upon receiving this reject message, the UE changes the cell to the one indicated by the previous step (macrocell), Step S'5, after reselection to the macrocell, the UE sends the paging response message, and, the normal call establishment occurs using the macrocell.

Figure 4:
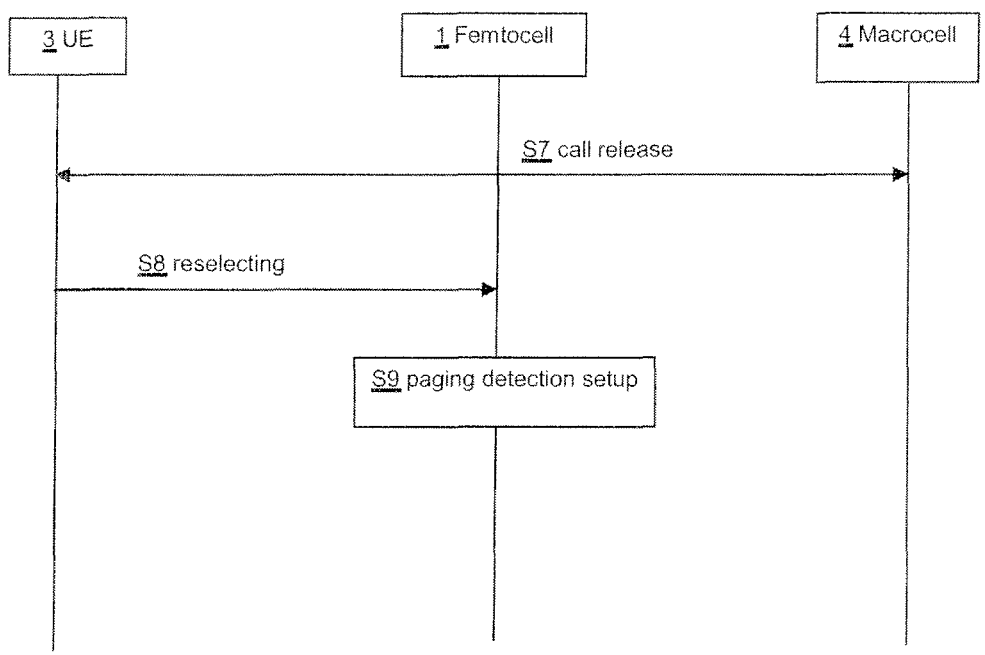
FIG. 4 is a second flow chart of a method according to the embodiment.

As illustrated in FIG. 4, after the redirection to macrocell occurs and this call is finished, the handset releases the radio resource with this macrocell and goes back to idle mode, step S7. At this time, if the handset is still within the environment where the radio condition from the femtocell is better for cell re-selection perspective, the handset re-select the femtocell, step 8. On the other hand, if the handset moves to an environment where the existing macrocell has sufficient signal quality compared to the femtocell, the handset stays with this macrocell with which the call was last made.

If the UE reselects to the femtocell, the femtocell adds that UE to the paging list.

Figure 5:
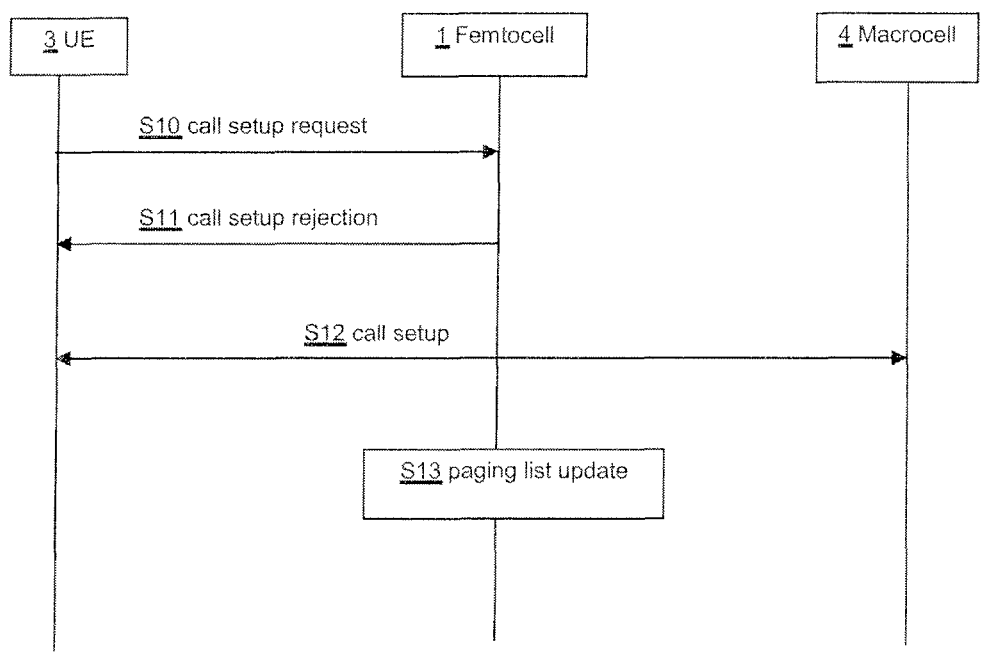
FIG. 5 is a third flow chart of a method according to the embodiment.

When the UE user originates a 3G call, as indicated in FIG. 5, the signaling is sent to the femtocell, step S10. The femtocell rejects the call origination request, step S11, and redirects the call to the nearby macrocell, step S12. This triggers the UE to reselect the macrocell. Then the call origination proceeds with the macrocell. In the meantime, the femtocell does no longer listen to paging message issued for that UE; it releases that UE from the paging list, step S13.

According to a variant embodiment, when redirecting the UE, the femtocell also informs the UE on the reason for redirection in the RRC connection reject message where fields such as rejection cause or redirection info are added. This permits the end user of the UE to be aware of the redirection, and in particular to be aware of the switch to a different charging practice.

Alternatively, when detecting that the DSL link is down, the femtocell informs the UE that the DSL link is inactive. This permits the end user to anticipate that an outgoing call will not use the DSL link, but the macrocell with a different charging practice.

Of course, it is possible that the end user is aware of whether the handset is connected to the femtocell or not (e.g. nearby macrocell instead). 3GPP specification defines a string of text that a femtocell broadcasts so that user's handset can display this information. It is defined in 3GPP TS 25.331 V8.6.0 (2009-03), '3rd Generation Partnership Project; Technical Specification Group Radio Access Network; Radio Resource Control (RRC); Protocol Specification (Release 8)', noted TS 25.331; in particular in section 8.1.1 on Broadcast of system information. This way, user can be aware of whether the handset is connected to the femtocell or not (or which femtocell). However, this is not a mandatory functionality. A particular femtocell implementation can choose not to support this functionality.

When the DSL link is up again, the paging module is deactivated, and the paging list is cleared. The femtocell does no longer listen to the nearby available macrocell for the paging traffic.

Optionally the femtocell informs the UE on the fact that the DSL link is active again. This permits the end user of that UE to know that an outgoing call will not be redirected to the macrocell.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. A method at a femtocell device comprising a first interface for communicating to a cellular radio network and a second interface for communicating to the Internet over a broadband network, said femtocell device enabling at least one cellular device associated with the femtocell device to access said broadband network through said second interface of said femtocell device, said method comprising, when communication at said femtocell device to said broadband network becomes inactive,
   maintaining said connection with said at least one cellular device,
   listening to paging traffic for the at least one cellular device associated with the femtocell received at said first interface from a base station of a cellular network serving a macrocell, and
   on reception of a paging message from said base station destined to one of said at least one cellular device, forwarding said paging message to said one of said at least one cellular device, rejecting a paging response from said one of said at least one cellular device and notifying said one of said at least one cellular device to reselect said macrocell to establish a call,
   wherein when communication at said femtocell device to said broadband network is inactive, and if no cellular device is connected to said femtocell device, deactivating said second interface.

2. Method according to claim 1, comprising indicating in said notification a reason for redirection.

3. Method according to claim 1 comprising notifying said cellular device when communication to said broadband network becomes inactive.

4. Method according claim 1, comprising notifying said cellular device when communication to said broadband network becomes active.

5. Method according to claim 1, comprising, on reception of a mobile network call setup from said cellular device, rejecting said call setup, and notifying said cellular device to redirect to a base station of a cellular network serving a macrocell.

6. A femtocell device comprising:
   a first interface for communicating to a cellular radio network;
   a second interface enabling a cellular device associated with said femtocell device to access the Internet over a broadband network;
   a paging module for, when communication to said broadband network is inactive, identifying paging messages for the cellular device associated with the femtocell received at said first interface from a base station of a cellular network serving a macrocell destined to the cellular device connected to said femtocell device, and
   a redirecting module for, on reception of a paging message from said base station destined to the cellular device connected to said femtocell device, rejecting a paging response from the cellular device and notifying said cellular device to reselect said macrocell to establish a call,
   wherein when communication at said femtocell device to said broadband network is inactive, and if no cellular device is connected to said femtocell device, deactivating said second interface.

7. The femtocell device according to claim 6, wherein when communication to said broadband network is active said paging module does not listen to paging traffic received at said first interface from said base station of a cellular network serving a macrocell.

8. The femtocell device according to claim 6, wherein on reception of a mobile network call setup from said cellular device, said redirecting module rejects said call setup, and notifies said cellular device to redirect to said macrocell.

* * * * *